United States Patent
Chen et al.

(10) Patent No.: US 10,313,432 B2
(45) Date of Patent: Jun. 4, 2019

(54) MULTI-MICROCONTROLLER SYSTEM, INTERNET OF THINGS GATEWAY SYSTEM, AND CONTROL FLOW OF MULTI-MICROCONTROLLER SYSTEM BASED ON NETWORK BRIDGE

(71) Applicant: National Central University, Taoyuan (TW)

(72) Inventors: Ching-Han Chen, Taoyuan (TW); Jhong-Ci Liou, Taoyuan (TW)

(73) Assignee: National Central University, Taoyuan (TW)

( * ) Notice: Subject to any disclaimer, the term of this patent is extended or adjusted under 35 U.S.C. 154(b) by 338 days.

(21) Appl. No.: 15/385,312

(22) Filed: Dec. 20, 2016

(65) Prior Publication Data

US 2018/0176292 A1 Jun. 21, 2018

(51) Int. Cl.
*G06F 15/16* (2006.01)
*H04L 29/08* (2006.01)
*H04L 12/66* (2006.01)
*H04L 29/06* (2006.01)

(52) U.S. Cl.
CPC .......... *H04L 67/1002* (2013.01); *H04L 12/66* (2013.01); *H04L 67/42* (2013.01); *H04L 67/12* (2013.01)

(58) Field of Classification Search
USPC ....... 709/203, 206, 217, 219, 223, 224, 226, 709/228, 230, 232, 238; 710/260; 714/15; 370/465
See application file for complete search history.

(56) References Cited

U.S. PATENT DOCUMENTS

| 6,401,154 | B1 * | 6/2002 | Chiu | G06F 13/24 710/260 |
| 10,153,916 | B1 * | 12/2018 | Kostrun | H04L 12/40013 |
| 2011/0169659 | A1 * | 7/2011 | Dalla | G01D 4/006 340/870.02 |
| 2012/0323394 | A1 * | 12/2012 | Gandhi | H05B 33/0857 700/297 |
| 2013/0121346 | A1 * | 5/2013 | Mitchell | H04L 69/163 370/465 |
| 2014/0298091 | A1 * | 10/2014 | Carlen | H04L 65/80 714/15 |

\* cited by examiner

*Primary Examiner* — Quang N Nguyen
(74) *Attorney, Agent, or Firm* — Ming Chow; Sinorica, LLC

(57) ABSTRACT

A multi-microcontroller system, comprising a master microcontroller and a plurality of slave microcontrollers; wherein the master microcontroller is connected with the slave microcontrollers respectively via a network bridge; the network bridge forms a first communication part with a first memory interface and a first SPI interface, the plurality of first communication parts are connected with the master microcontroller and the slave microcontrollers, respectively; the network bridge is primarily responsible for processing transmission of control signals and data between the master microcontroller and the slave microcontrollers, and serves as a temporary storage area for common memory such that the states of the slave microcontrollers are put under automated management, the addresses of the slave microcontrollers are designated, and memory blocks are allocated.

11 Claims, 3 Drawing Sheets

MULTI-MICROCONTROLLER SYSTEM, INTERNET OF THINGS GATEWAY SYSTEM, AND CONTROL FLOW OF MULTI-MICROCONTROLLER SYSTEM BASED ON NETWORK BRIDGE

TECHNICAL FIELD

The present invention relates to a multi-microcontroller system, an Internet of Things (IoT) gateway system and a control method of a cloud networked control system, and in particular to a module consisting of a plurality of microcontrollers with distributed processing.

BACKGROUND ART

As industry is entering a new era of Internet of Things (IoT), transmission, reception and processing between humans and objects as well as between objects are realized by aid of networking technologies, and a wide variety of controls, detections and recognitions and services are offered. Such an architecture has shaped a large discrete network encompassing limitless possibilities. Billions of apparatuses that are endowed with embedded techniques can be placed under management, achieve seamless interconnections, and interact with one another in a secure way over networks.

A description of Machine to Machine (M2M) communications has been seen in Industrial Internet of Things (IIoT), that is to say, a machine can interact and communicate with other machines, objects, environments, infrastructures and the like. This communication results in the formation of a large amount of data, which, after being processed and analyzed, can be leveraged to provide significant real-time decisions for management and control.

Microcontroller is utilized as the core of traditional gateways in small IoT application architectures having low power consumption, and therefore has become a core technology in pushing forward the development of Machine to Machine (M2M) communications. It enables an integration of peripherals such as CPU, program memory, a data storage unit, Timer/Counter and DI/DO/AI/AO, into a microcomputer on one chip. With the features like small size, low power consumption, simple input/output interfaces, fast development and high reliability in the absence of an operating system, microcontrollers have made themselves suitable for use in the development of IoT gateways.

Traditional IoT gateways are developed in such a manner that a single microcontroller is used in conjunction with peripherals. However, the microcontroller is a component designed for applications, so disparate combined components need to be devised in the light of individual applications in order to meet market's demands. Having failed to meet the wide market with a single architecture, manufactures have to provide microcontrollers that have different core quantities, transmission interfaces, I/O pin quantities and functions. When confronted with the problems that one IoT gateway cannot satisfy the demands to lead to an overly slow command cycle of the processor or that there is an insufficient number of hardware peripherals, developers must redesign the software and hardware architectures of microcontrollers as required by applications or replace the processor with a higher order one to cope with various application scenarios.

Thus, how to provide a microcontroller system and an IoT gateway control system that still have outstanding transmission speeds, stability and functionality even in case of a tremendous amount of data transmissions has become a prominent task in this field for which improvements and endeavors need to be made immediately.

SUMMARY OF THE INVENTION

In view of this, the present invention is intended to provide a multi-microcontroller system, which comprises a master microcontroller and a plurality of slave microcontrollers; wherein the master microcontroller is connected with the plurality of slave microcontrollers respectively via a network bridge; the network bridge forms a first communication part with a first memory interface and a first SPI interface, the plurality of first communication parts are connected with the master microcontroller and the slave microcontrollers, respectively; the network bridge is primarily responsible for processing transmission of control signals and data between the master microcontroller and the plurality of slave microcontrollers, and serves as a temporary storage area for common memory such that the states of the plurality of slave microcontrollers are put under automated management, the addresses of the slave microcontrollers are designated, and memory blocks are allocated.

In addition, the present invention further provides an IoT gateway system, which comprises a master microcontroller, a network bridge and a plurality of slave microcontrollers; the master microcontroller and the network bridge are arranged in a master device, the plurality of slave microcontrollers are each arranged in a plurality of electronic devices; the network bridge forms a first communication part with a first memory interface and a first SPI interface; the master microcontroller is connected with the first communication part through a second communication part, and the second communication part comprises a second memory interface and a second SPI interface; the plurality of slave microcontrollers are connected with the first communication part through a third communication part, and the third communication part comprises a third memory interface and a third SPI interface; thus the plurality of electronic devices are managed by the master device via the network bridge.

Furthermore, the present invention further provides a control flow of a multi-microcontroller system based on a network bridge. The multi-microcontroller system comprises a master microcontroller and a plurality of slave microcontrollers;

wherein the master microcontroller is connected with the plurality of slave microcontrollers via a network bridge. The control flow of the multi-microcontroller system comprises the following steps:

step 1: the master microcontroller, the network bridge and the plurality of slave microcontrollers are initialized;

step 2: the network bridge inquires the master microcontroller and the slave microcontrollers and assigns IDs and addresses to the master microcontroller and the slave microcontrollers;

step 3: the number of the slave microcontrollers is returned to the master microcontroller and then the network bridge judges whether the master microcontroller sends a command of data retrieval; if so, proceeding with step 4, and if not, returning to step 1;

step 4: the network bridge analyzes the command sent by the master microcontroller, and the command includes a designated ID in the slave microcontrollers and a control command;

step 5: the foregoing control command is executed on the designated ID of the slave microcontroller; and step 6: a value returned by the slave microcontroller is received, returning to step 1 upon the completion of reception.

As a result, with the network bridge utilizing two different communication protocols, data transmission and state control can be carried out synchronously, resulting in a higher operating efficiency. In addition, the number of nodes can be detected, namely the number of the slave microcontrollers is detected, and a correspondence between the current state of a node and the ID number of the node is detected. Meanwhile, it can be monitored, at any time during the process of system operation, whether a new node is added or whether there is a node loss, and in this way plug detection is achieved. And when a user wants to control a certain slave node, the network bridge can receive a command from the master microcontroller and determine node addresses and update the nodes to their latest states. In the meantime, the network bridge is capable of allocating a dedicated memory space to each node, making it possible that the nodes can exploit their memory spaces freely and thus improving the extendibility of peripheral hardware in future.

DETAILED DESCRIPTION OF THE INVENTION

The present invention discloses a multi-microcontroller system, an IoT gateway system and a control flow of a multi-microcontroller system based on a network bridge, wherein the relevant basic principles involved, such as communication protocols and wireless links, have been appreciated by those ordinary skilled in related technical fields. For this reason, a complete description thereof is no longer provided hereinafter. Also, it should be noted that the drawings for comparison given below are intended to show structural schematic illustrations related to the features of the present invention, and are not and does not need to be completely drawn in accordance with actual sizes.

Figure 1:
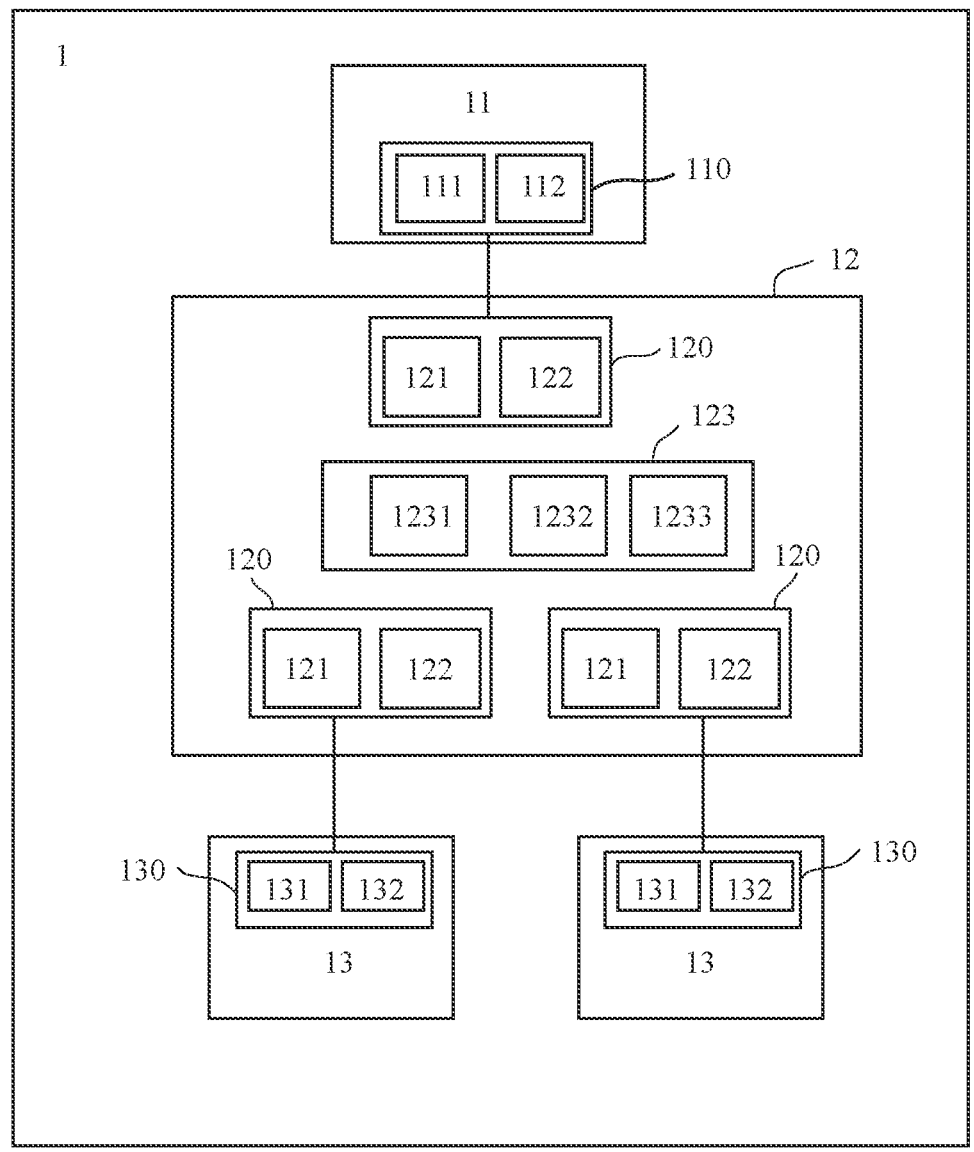
FIG. 1 is a schematic illustration of a multi-microcontroller system provided in the present invention.

With reference to FIG. 1, the present invention provides a multi-microcontroller system comprising a master microcontroller 11 and a plurality of slave microcontrollers 13; wherein the master microcontroller 11 is connected with the plurality of slave microcontrollers 13 respectively via a network bridge 12; the network bridge 12 forms a first communication part 120 with a first memory interface 121 and a first SPI interface 122, the plurality of first communication parts 120 are connected with the master microcontroller 11 and the plurality of slave microcontrollers 13, respectively; the network bridge 12 is primarily responsible for processing transmission of control signals and data between the master microcontroller 11 and the plurality of slave microcontrollers 13, and serves as a temporary storage area for common memory such that the states of the plurality of slave microcontrollers 13 are put under automated management, the addresses of the slave microcontrollers 13 are designated, and memory blocks are allocated.

In a preferred embodiment, the network bridge 12 may be a Field Programmable Gate Array (FPGA) or an Application-Specific Integrated Circuit (ASIC).

Wherein the master microcontroller 11 is connected with the first communication part 120 of the network bridge 12 through a second communication part 110, and the second communication part 110 comprises a second memory interface 111 and a second SPI interface 112.

And the plurality of slave microcontrollers 13 are connected with the first communication part 120 of the network bridge 12 through a third communication part 130, and the third communication part 130 comprises a third memory interface 131 and a third SPI interface 132.

Wherein the first memory interface 121, the second memory interface 111 and the third memory interface 131 function as data communication interfaces; and the first SPI interface 122, the second SPI interface 112 and the third SPI interface 132 function as state control interfaces.

In this embodiment, two slave microcontrollers 13 are provided, and therefore the network bridge 12 is at least provided with three first communication parts 120, some of which are connected with the master microcontroller 11 and the slave microcontrollers 13, wherein transmission of control signals and data among the first communication part 120, the second communication part 110 and the third communication part 130 is accomplished by use of ZigBee, Mobile Communications 2G, 3G and 4G, Bluetooth, USB, CAN, VPN, Wi-Fi or MQTT protocols. Here, it is particularly noted that the ways of communication and the number of the slave microcontrollers 12 are not limited to this. The number of the slave microcontrollers 13 may be increased as desired, in which case it is only required that the number of the first communication parts 120 of the network bridge is increased correspondingly.

In addition, with continued reference to FIG. 1, in a preferred embodiment, the network bridge 12 further comprises a master controller 123 that is responsible for analyzing a command sent by the master microcontroller 11 and for data transfer between the master microcontroller 11 and the plurality of slave microcontrollers 13. The master controller 123 is composed of a microprogram control unit 1231, a datapath unit 1232 and a function unit 1233.

The multi-microcontroller system 1 provided in the present invention is to integrate a plurality of microcontrollers into a large, virtual microcontroller module 1 via a network bridge 12, with one of the plurality of microcontrollers serving as the master microcontroller 11 and the others as the slave microcontrollers 13. The master microcontroller 11 is used for executing a monitoring function, managing the states of all the slave microcontrollers 13 and retrieving data, and has the capability of virtualizing all the slave microcontrollers 13, including their peripherals such as Timer/Counter, DI/DO/AI/AO, into a super-large microcontroller. This multi-microcontroller system has a very wide range of applicable fields in the future, e.g. industrial control, consumer electronics, health and medical care, household applications, automotive electronics and the like.

Figure 2:
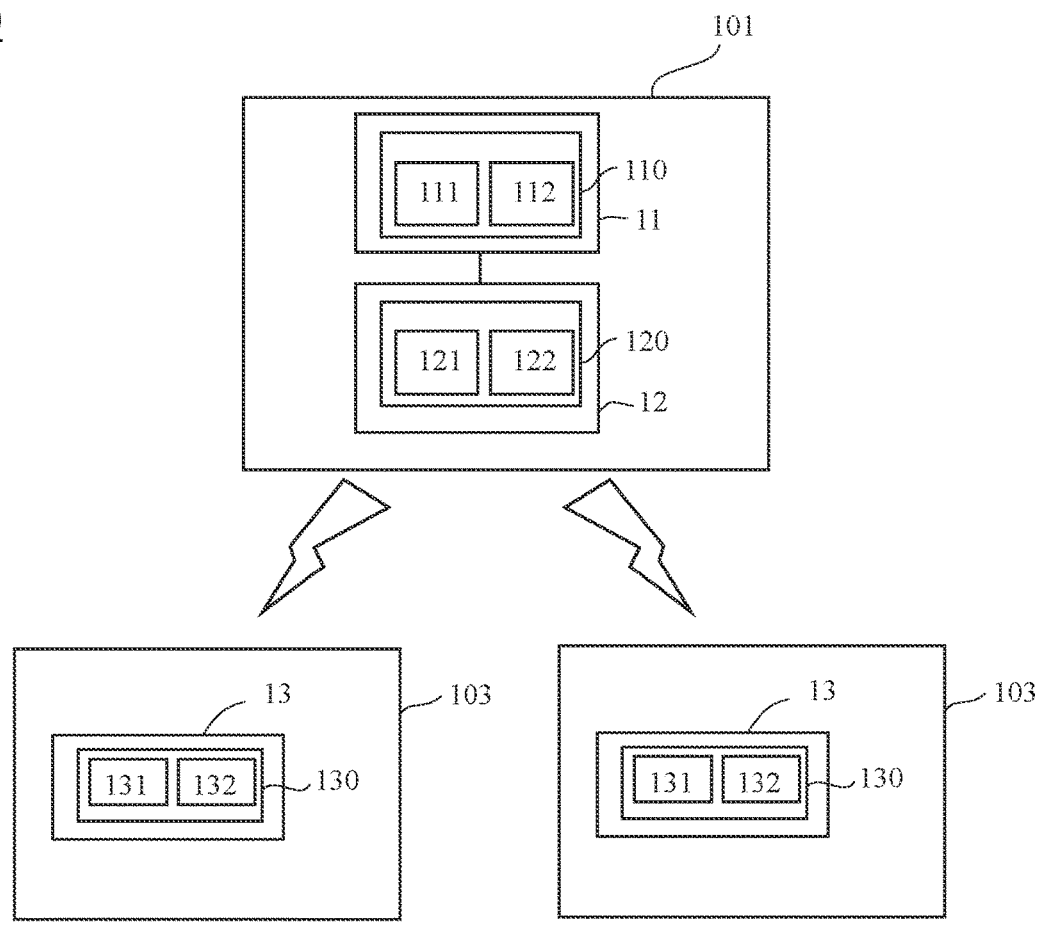
FIG. 2 is a schematic illustration of an IoT gateway system provided in the present invention.

With reference to FIG. 2, the present invention further provides an IoT gateway system 10, which comprises a master microcontroller 11, a network bridge 12 and a plurality of slave microcontrollers 13; the master microcontroller 11 and the network bridge 12 are arranged in a master device 101, the plurality of slave microcontrollers 13 are each arranged in a plurality of electronic devices 103. The network bridge 12 forms a first communication part 120 with a first memory interface 121 and a first SPI interface 122; the master microcontroller 11 is connected with the first communication part 120 through a second communication part 110, and the second communication part 110 comprises a second memory interface 111 and a second SPI interface 112; the plurality of slave microcontrollers 13 are connected with the first communication part 120 through a third communication part 130, and the third communication part 130 comprises a third memory interface 131 and a third SPI interface 132; thus the master device 101 is communicated with the plurality of slave microcontrollers 13 via the network bridge 12 so as to manage the plurality of electronic devices 103 simultaneously.

Wherein data transfer among the network bridge 12, the master microcontroller 11 and the plurality of slave microcontrollers 13, as well as the ways of communication, are as described above, so further description thereof is omitted herein for simplicity. And the electronic device 103 mentioned herein may be one of or a mixture of the group consisting of a camera, a sensor, an actuator, a DI/DO or a programmable logic controller (PLC).

Figure 3:
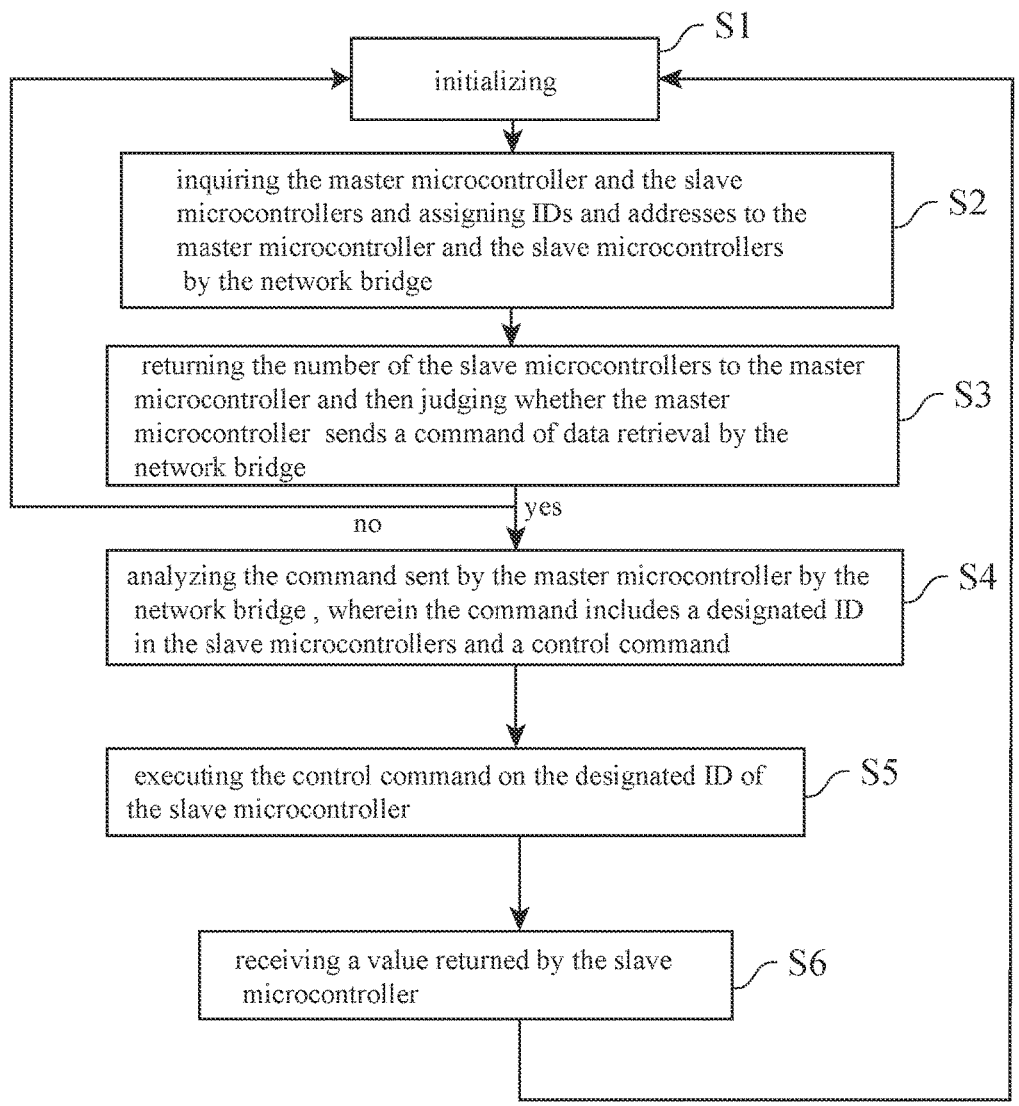
FIG. 3 is a schematic illustration of a control flow of a multi-microcontroller system based on a network bridge provided in the present invention.

With reference to FIG. 3, which illustrates a control flow of a multi-microcontroller system based on a network bridge provided in the present invention, the multi-microcontroller system mentioned herein is as described above, so further description thereof is omitted herein for simplicity. The control flow of the multi-microcontroller system comprises the following steps:

step 1 (S1): the master microcontroller 11, the network bridge 12 and the plurality of slave microcontrollers 13 are initialized;

step 2 (S2): the network bridge 12 inquires the master microcontroller 11 and the plurality of slave microcontrollers 13 and assigns ID numbers and addresses to the master microcontroller 11 and the slave microcontrollers 13;

step 3 (S3): the number of the plurality of slave microcontrollers 13 is returned to the master microcontroller 11 and then the network bridge 13 judges whether the master microcontroller 11 sends a command of data retrieval; if so, proceeding with step 4 (S4), and if not, returning to step 1 (S1);

step 4 (S4): the network bridge 13 analyzes the command sent by the master microcontroller 11, and the command includes a designated ID in the slave microcontrollers and a control command 13;

step 5 (S5): the foregoing control command is executed on the designated ID of the slave microcontroller 13; and step 6 (S6): a value returned by the slave microcontroller 13 is received, returning to step 1 upon the completion of reception.

According to the multi-microcontroller system 1, the IoT gateway system 10 and the control flow of a multi-microcontroller system based on a network bridge in the present invention, with the network bridge 12 utilizing two different communication protocols, data transmission and state control can be carried out synchronously, resulting in a higher operating efficiency. In addition, the number of nodes can be detected, namely the number of the slave microcontrollers is detected, and a correspondence between the current state of a node and the ID number of the node is detected. Meanwhile, it can be monitored, at any time during the process of system operation, whether a new node is added or whether there is a node loss, and in this way plug detection is achieved. And when a user wants to control a certain slave node (the slave microcontroller 13), the network bridge 12 can receive a command from the master microcontroller 11 and determine node addresses and update the nodes to their latest states. In the meantime, the network bridge 12 is capable of allocating a dedicated memory space to each node, making it possible that the nodes can exploit their memory spaces freely and thus improving the extendibility of peripheral hardware in future.

The above description is only the preferred embodiments of the present invention and is not intended to limit the applied patent right of the present invention. And also, what has been described above shall be appreciated and implemented by those skilled in the technical field. Therefore, other equivalent variations or modifications made without departing from the spirit disclosed in the present invention shall be included in the scope of the claims.

The invention claimed is:

1. A multi-microcontroller system, comprising:
   a master microcontroller and a plurality of slave microcontrollers;
   wherein the master microcontroller is connected with the plurality of slave microcontrollers respectively via a network bridge;
   the network bridge forms a first communication part with a first memory interface and a first SPI interface, a plurality of first communication parts are connected with the master microcontroller and the plurality of slave microcontrollers, respectively;
   the network bridge is primarily responsible for processing transmission of control signals and data between the master microcontroller and the slave microcontrollers, and serves as a temporary storage area for common memory such that the states of the plurality of slave microcontrollers are put under automated management, the addresses of the plurality of slave microcontrollers are designated, and memory blocks are allocated;
   wherein the network bridge further comprises a master controller that is responsible for analyzing a command sent by the master microcontroller and for data transfer between the master microcontroller and the plurality of slave microcontrollers;
   wherein the master controller is composed of a microprogram control unit, a datapath unit and a function unit.

2. The multi-microcontroller system of claim 1, wherein the network bridge can consist of a Field Programmable Gate Array (FPGA) or an Application-Specific Integrated Circuit (ASIC).

3. The multi-microcontroller system of claim 2, wherein the master microcontroller is connected with the first communication part through a second communication part, and the second communication part comprises a second memory interface and a second SPI interface.

4. The multi-microcontroller system of claim 3, wherein the plurality of slave microcontrollers are connected with the first communication part through a third communication part, and the third communication part comprises a third memory interface and a third SPI interface.

5. The multi-microcontroller system of claim 4, wherein the first memory interface, the second memory interface and the third memory interface function as data communication interfaces; and the first SPI interface, the second SPI interface and the third SPI interface function as state control interfaces.

6. An Internet of Things gateway system, comprising:
   a master microcontroller, a network bridge and a plurality of slave microcontrollers;
   wherein the master microcontroller and the network bridge are arranged in a master device, and the plurality of slave microcontrollers are each arranged in a plurality of electronic devices;

the network bridge forms a first communication part with a first memory interface and a first SPI interface;

the master microcontroller is connected with the first communication part through a second communication part, and the second communication part comprises a second memory interface and a second SPI interface;

the plurality of slave microcontrollers are connected with the first communication part through a third communication part, and the third communication part comprises a third memory interface and a third SPI interface;

thus the plurality of electronic devices are managed by the master device via the network bridge;

wherein the network bridge is connected with the second communication part and the third communication part respectively via the first communication part, processes transmission of control signals and data between the master microcontroller and the plurality of slave microcontrollers, and serves as a temporary storage area for common memory such that the states of the plurality of slave microcontrollers are put under automated management, the addresses of the plurality of slave microcontrollers are designated, and memory blocks are allocated.

7. The Internet of Things gateway system of claim 6, wherein transmission of control signals and data among the first communication part, the second communication part and the third communication part is accomplished by use of ZigBee, Mobile Communications 2G, 3G and 4G, Bluetooth, USB, CAN, VPN, Wi-Fi or MQTT protocols.

8. The Internet of Things gateway system of claim 6, wherein the network bridge further comprises a master controller that is responsible for analyzing a command sent by the master microcontroller and for data transfer between the master microcontroller and the plurality of slave microcontrollers.

9. The Internet of Things gateway system of claim 8, wherein the master controller is composed of a microprogram control unit, a datapath unit and a function unit.

10. The Internet of Things gateway system of claim 6, wherein the electronic device is one of or a mixture of the group consisting of a camera, a sensor, an actuator, a DI/DO or a programmable logic controller (PLC).

11. A control flow of a multi-microcontroller system based on a network bridge, the multi-microcontroller system comprising a master microcontroller and a plurality of slave microcontrollers, wherein the master microcontroller is connected with the plurality of slave microcontrollers respectively via a network bridge, the control flow comprises the following steps:

step 1: initializing the master microcontroller, the network bridge and the plurality of slave microcontrollers;

step 2: inquiring the master microcontroller and the plurality of slave microcontrollers and assigning IDs and addresses to the master microcontroller and the plurality of slave microcontrollers by the network bridge;

step 3: returning the number of the plurality of slave microcontrollers to the master microcontroller and then judging whether the master microcontroller sends a command of data retrieval by the network bridge; if so, proceeding with step 4, and if not, returning to step 1;

step 4: analyzing the command sent by the master microcontroller by the network bridge, wherein the command includes a designated ID of one of the plurality of slave microcontrollers and a control command;

step 5: executing the control command on the designated ID of the slave microcontroller; and step 6: receiving a value returned by the slave microcontroller, and returning to step 1 upon the completion of reception;

wherein a memory interface functions as a data communication interface and an SPI interface functions as a state control interface among the master microcontroller, the network bridge and the slave microcontroller.

* * * * *